(12) United States Patent
Freeman et al.

(10) Patent No.: US 6,377,520 B2
(45) Date of Patent: Apr. 23, 2002

(54) ROBUST AND VERSATILE FOCUS/TRACKING METHOD AND SYSTEM FOR OPTICAL PICKUP HEADS

(75) Inventors: Mark O. Freeman, San Mateo, CA (US); Jinn-Kang Wang, Yong-Ho; Hsi-Fu Shih, Chang-Hua Hsien, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/063,946

(22) Filed: Apr. 21, 1998

(30) Foreign Application Priority Data

Oct. 15, 1997 (TW) ............................................. 86115108

(51) Int. Cl.$^7$ ................................................. G11B 7/00
(52) U.S. Cl. ............................... 369/44.23; 369/44.41
(58) Field of Search .......................... 369/112, 44.37, 369/44.23, 109, 103, 121, 44.38, 44.41, 116, 44.42, 54, 59, 110, 124, 44.14, 112.07, 112.12, 112.15, 112.13, 44.12, 112.17

(56) References Cited

U.S. PATENT DOCUMENTS

| | | | | |
|---|---|---|---|---|
| 4,771,415 A | * | 9/1988 | Taki ............................. 369/112 |
| 4,775,968 A | * | 10/1988 | Ohsato ........................... 369/46 |
| 4,815,060 A | * | 3/1989 | Nomura ..................... 369/44.23 |
| 4,945,529 A | * | 7/1990 | Ono et al. .................... 369/109 |
| 5,111,448 A | * | 5/1992 | Komma et al. .......... 369/44.23 |
| 5,140,577 A | * | 8/1992 | Ohsato ..................... 369/44.37 |
| 5,172,369 A | * | 12/1992 | Chikuma et al. ............ 369/112 |
| 5,283,775 A | * | 2/1994 | Finkelstein et al. ........... 369/54 |
| 5,283,778 A | * | 2/1994 | Maeda ......................... 369/112 |
| 5,465,247 A | * | 11/1995 | Kobayashi ................... 369/109 |
| 5,523,993 A | * | 6/1996 | Freeman ...................... 369/109 |
| 5,557,601 A | * | 9/1996 | Nishikawa ................... 369/121 |
| 5,652,744 A | * | 7/1997 | Freeman et al. ........ 369/112.07 |
| 5,682,373 A | * | 10/1997 | Kim ............................. 369/112 |
| 5,787,064 A | * | 7/1998 | Matsui ......................... 369/112 |
| 5,805,557 A | * | 9/1998 | Furuhata et al. ............. 369/109 |

FOREIGN PATENT DOCUMENTS

| | | | |
|---|---|---|---|
| JP | 59-132433 | * | 7/1984 |
| JP | 63-229640 | * | 9/1988 |
| JP | 1-94541 | * | 4/1989 |
| JP | 5-47016 | * | 2/1993 |

* cited by examiner

Primary Examiner—David Hudspeth
Assistant Examiner—Kim-Kwok Chu
(74) Attorney, Agent, or Firm—Blakely Sokoloff Taylor & Zafman

(57) ABSTRACT

A focus/tracking method and system is provided for use in an optical drive with a possibly multiple-wavelength laser source for control of the focus/tracking of the pickup head of the optical drive. The use of a multiple-wavelength laser source allows the optical drive to read data from various types of optical discs. The focus/tracking method and system combines the use of a differential, dual optical channel method for focusing control of the laser beam used to read data from the optical disc and the use of the single-beam tracking method for tracking control of the same. The focus error signal and the tracking error signal can be obtained from the same set of multi-element photodetectors. The structure of the system can therefore be simplified to include a reduced number of constituent components thus allowing a reduction in manufacturing cost.

40 Claims, 10 Drawing Sheets

ROBUST AND VERSATILE FOCUS/TRACKING METHOD AND SYSTEM FOR OPTICAL PICKUP HEADS

CROSS-REFERENCE TO RELATED APPLICATION

This application claims the priority benefit of Taiwan application serial no. 86115108, filed Oct. 15, 1997, the full disclosure of which is incorporated herein by reference.

BACKGROUND OF THE INVENTION

1. Field of the Invention

This invention relates to optical drives used to read information from optical discs, and more particularly, to a focus/tracking method and system for use on an optical drive, which is capable of detecting both the focusing error and the tracking error of the pickup head to thereby control the focus/tracking of the same during read or write operation on an optical disc. This invention allows the focus/tracking method and system for the optical drive to be simplified in structural complexity, thereby saving manufacturing cost.

2. Description of Related Art

Pickup heads for optical discs must produce signals that indicate whether the optical stylus is in focus on the disc surface and the position of the optical stylus with respect to the information track besides just reading the coded information from the disc. As information is being recorded on the discs with ever-increasing density and in multiple layers, and as the number of styles of optical discs that a single pickup is expected to read is also increasing, more robust and versatile methods for producing these signals are called for.

It is well known that single-beam tracking performs better than three-beam tracking (which is commonly used for CD drives) when the tracks are spaced more closely together and there are multiple layers of information on the discs as, for example, in DVD discs. Single-beam tracking, which includes the methods of pushpull tracking, heterodyne tracking, and differential phase detection (DPD), also has the advantage over three-beam tracking of being generated directly from the disc information track rather than requiring critical alignment of tracking spots. Heterodyne and DPD tracking further have an advantage over pushpull tracking in that the pit depth which maximizes these tracking signals is the same as the depth which maximizes the information signal; whereas for pushpull tracking, its signal is at maximum at the pit depth which minimizes the information signal.

Multiple wavelength sources are required in pickups which are used to handle a wide variety of disc media. For example, red lasers of around 650 nm wavelength are required for reading DVD discs, while write-once CD-R media must be read using an infra-red laser with a wavelength around 780 nm. In order to avoid multiplying the number of components in the pickup, one set for each wavelength, a new means for generating the focus/tracking signals is needed which can be aligned properly for all of the wavelengths simultaneously. The differential spot-size detection method for focus-error signal generation is such a system that can be aligned for multiple wavelengths simultaneously but it is incompatible with heterodyne and DPD single-beam tracking methods.

Prior art for this invention includes a description of differential spot-size detection disclosed in Japanese Laid-Open Patent Document Number 63-229640 dated Sep. 26, 1988. The essential information processing scheme is reproduced in FIG. 1A, which includes a laser source 10, a holographic beamsplitter element 11, an objective lens 12, and a pair of 3-element photodetectors 16, 17. The holographic beamsplitter element 11 is used to divide the beam returning from the disc 13 into two beams 14 and 15, which are incident respectively on two 3-element photodetectors 16, 17. The holographic beamsplitter element 11 further has a focusing effect which causes the first beam to focus in front of one of the 3-element photodetectors and causes the second beam to focus behind the other 3-element photodetector. The spots on the photodetectors are diagrammed in FIGS. 1B–1D for various cases of the focus of the optical stylus on the information surface of the disc. The focus error signal (FES) indicating the focus error of the optical stylus with respect to the information surface in the disc is given by combining the electrical signals generated by the photodetector elements as follows:

$$FES = (S_{A''} + S_{C''} - S_{B''}) - (S_A + S_C - S_B)$$

In the case shown in FIG. 1B, the stylus is focused behind the information surface which causes the spots from the two beams to have different sizes on their respective 3-element photodetectors and FES to be positive. For the case shown in FIG. 1C, the stylus is focused properly on the information surface, the spots from the two beams have the same size on their respective 3-element photodetectors, and FES=0. For the case shown in FIG. 1D, the stylus is focused in front of the information surface causing the spots from the two beams vary in a complementary manner to the case shown at the top and FES to be negative. For different wavelengths, the diffraction angles of the two beams from the holographic element vary, causing the spots to move along the photodetectors parallel to lines dividing the detector into three elements. This does not affect the resulting FES. Other prior art disclosing similar differential spot-size detection is found in U.S. Pat. No. 5,111,448 (May 1992). The drawback of these methods is that, since the complete beam area is incident on both of the 3-element photodetectors, there is no way to access the heterodyne and DPD tracking information which is embedded in an interference pattern in the beam.

An example of the interference pattern embedded in the beam is given in FIG. 2. A beam after experiencing diffraction from the information surface of the disc is shown centered on a coordinate system with quadrants labeled I, II, III, and IV. The arcs drawn within the main circular beam represent the overlap of the main circular beam and diffraction orders created by diffraction from the disc information surface. There is interference between these diffracted orders and the main beam. As the optical stylus moves on and off the information track, the intensity of these interference regions changes. The shaded areas indicate the interference regions that contribute to heterodyne and DPD tracking signals. Signals from each of the four quadrants must be available separately in order to generate these tracking signals. As stated above, the prior art for differential spot-size focus detection does not provide separate signals from these four quadrants and therefore cannot be used to generate these tracking signals. The astigmatic focus detection method is described in any introductory text to optical disc technology (e.g. A. B Marchant, Optical Recording, Addison Wesley Publishing, Reading, Mass., *990) and is a method which does provide separate access to the signals in each of the four quadrants. Moreover, for instance, U.S. Pat. No. 4,731,772 (Mar. 1988) uses a quadrant detector to provide separate signals from each of the four quadrants as shown in FIGS. 3A–3D. However, since the spot must remain centered on the quadrant photodetector, this approach is not tolerant of position shifts that will occur with multiple wavelength sources.

SUMMARY OF THE INVENTION

This invention uses a new method to combine some the best features of previously incompatible differential spot-size-detection focus-error and signal-beam tracking-error signal generation techniques to create a focus/tracking system that is well suited to multiple layer, high density and multiple wavelength optical disc systems while requiring a minimum number of components to implement.

This invention is compatible with all of the above-mentioned tracking methods, however the preferred embodiments utilize its special ability to produce heterodyne and DPD tracking signals in a multiple-wavelength system.

In accordance with the foregoing and other objectives of the present invention, a focus/tracking method and system for the pickup head of an optical drive is provided. The method of the invention includes the following steps of: generating a laser beam; focusing the laser beam on the optical disc; splitting the reflected light from the optical disc in half into a first half part and a second half part; guiding the first half part of the reflected light to a first optical axis while guiding the second half part of the reflected light to a second optical axis; at a fixed position on the first optical axis, detecting the first half part of the reflected light to thereby generating a first set of opto-electrical signals; at a fixed position on the second optical axis, detecting the second half part of the reflected light to thereby generating a second set of opto-electrical signals; and from the first and second set of opto-electrical signals, obtaining a focus error signal and a tracking error signal, the focus error signal being used for feedback control of the focusing of the laser beam until the laser beam is focused precisely on the optical disc, and the tracking error signal being used for feedback control of the tracking of the laser beam until the laser beam is spotted on the target data track.

The system of the invention includes the following constituent components: laser means for generating a laser beam of a specific wavelength; an objective lens, optically coupled to the laser means, for focusing the laser beam onto the optical disc; beam splitting means, optically coupled to the objective lens, capable of splitting the reflected light from the optical disc in half into a first half part and a second half part and directing the first half part of the reflected light to a first optical axis and the second half part of the reflected light to a second optical axis; a first photodetector disposed on the first optical axis, the first photodetector being formed with a plurality of light-sensitive elements capable of generating a first set of opto-electrical signals in response to the first half part of the reflected light spotted thereon; and a second photodetector disposed on the second optical axis, the second photodetector being formed with a plurality of light-sensitive elements capable of generating a second set of opto-electrical signals in response to the second half part of the reflected light spotted thereon. With the foregoing focus/tracking system, a focus error signal and a tracking error signal can be obtained from the first and second sets of opto-electrical signals from the first and second photodetectors. The focus error signal is used for feedback control of the focusing of the laser beam until the laser beam is focused precisely on the optical disc, while the tracking error signal is used for feedback control of the tracking of the laser beam until the laser beam is spotted on the target data track.

The foregoing focus/tracking method and system of the invention allows both of the focus error signal and the tracking error signal to be obtained from the same set of photodetectors, while still providing the benefits of maintaining alignment over multiple wavelengths and compatibility with single-beam tracking methods. The photodetectors used in the invention are each formed with a plurality of parallel light-sensitive elements. The light-sensitive elements of one photodetector are also in parallel with those on the other photodetector and perpendicular to the line which splits the light spot into two halves. This design scheme allows the photodetectors used in the invention to provide separate access to the signals in the four quadrants of the light spot as used in single-beam tracking methods. Furthermore, the elongated dimension of the light-sensitive elements is parallel to the direction light is deflected by the beamsplitter element allowing proper alignment between the beam and the light sensitive elements to be maintained even when the laser beam is changed in wavelength that causes a shift in the spotted location on these photodetectors. The invention is therefore suitable for use on an optical drive with a multiple-wavelength laser source.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The three preferred embodiments of this invention are disclosed in the following with reference to FIGS. 4,5, and 6, respectively. Each of them includes a laser light source with one or more wavelengths. These light sources include one or more lasers emitting at one or more wavelengths. Many possible methods might be used to accomplish the multiple wavelength sources, including; (1) a single laser which can be controlled to oscillate at different wavelengths; (2) a number of different lasers may be combined so that their light is coaxial using beam combiner elements such as standard reflective-type beamsplitters; (3) using optical fibers to carry light from separate laser sources and combining their light into a single fiber source using an optical fiber coupler or simply aligning the fibers side-by-side so as to create a nearly coaxial grouping of separate laser sources; (4) mounting one or more laser diode chips of various wavelengths onto a single substrate in such a way that the light emitted from each of the lasers is nearly coaxial with light emitted from the other lasers. Typically though not necessarily, only one of the laser wavelengths is turned on at any given instant.

First Preferred Embodiment

Figure 1A:
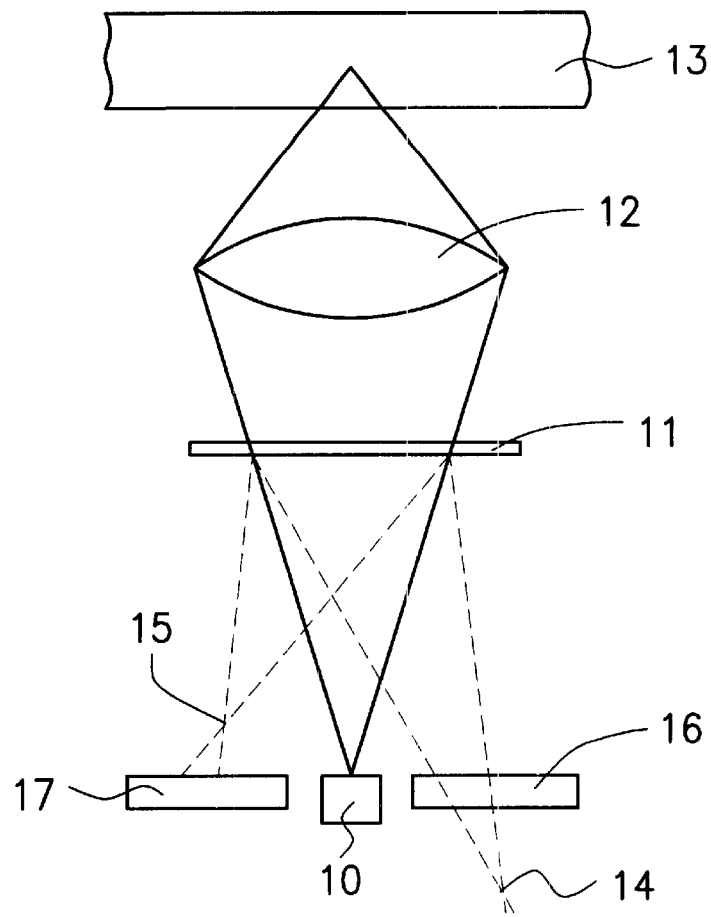
FIGs. 1A–1D are prior art representing a typical implementation of differential spot-size detection for generating a focus error signal.
Figure 1B:
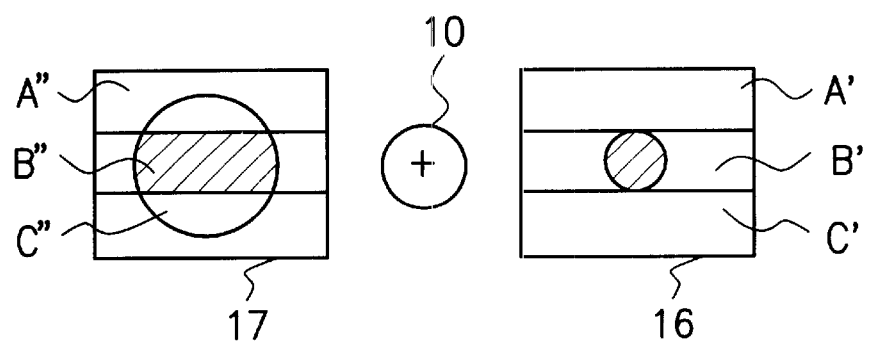
Figure 1C:
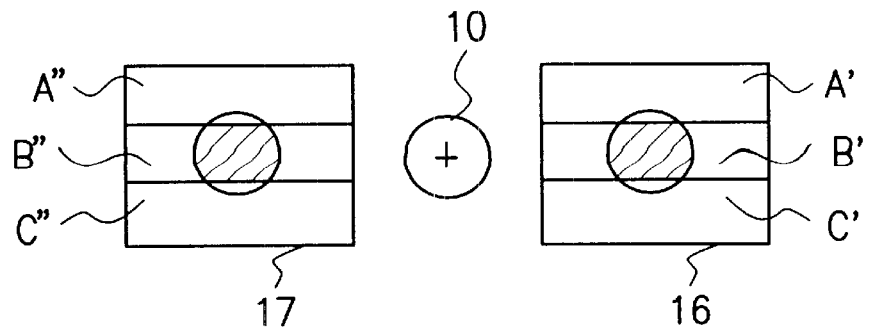
Figure 1D:
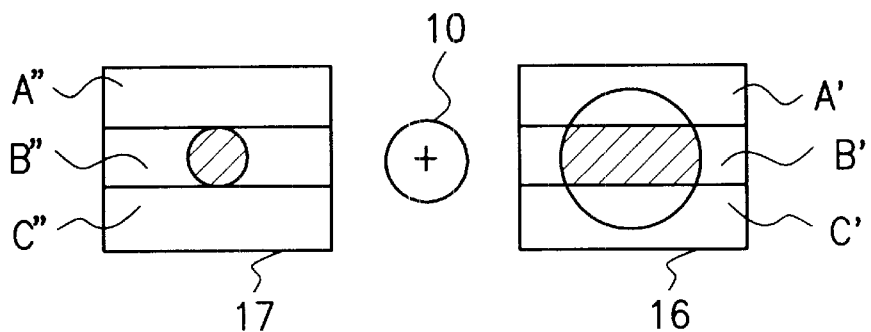
Figure 2:
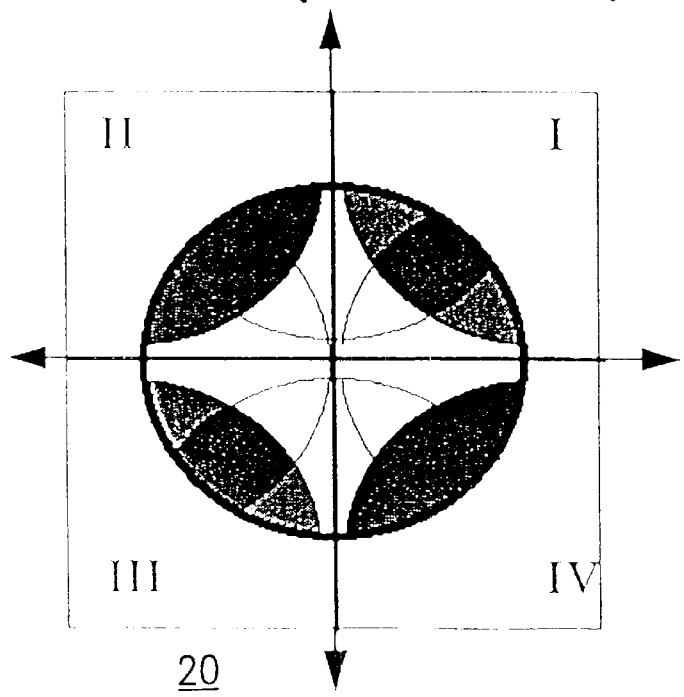
FIG. 2 is a schematic diagram showing the interference pattern embedded in the optical beam by diffraction from the information surface of the disc.
Figure 3A:
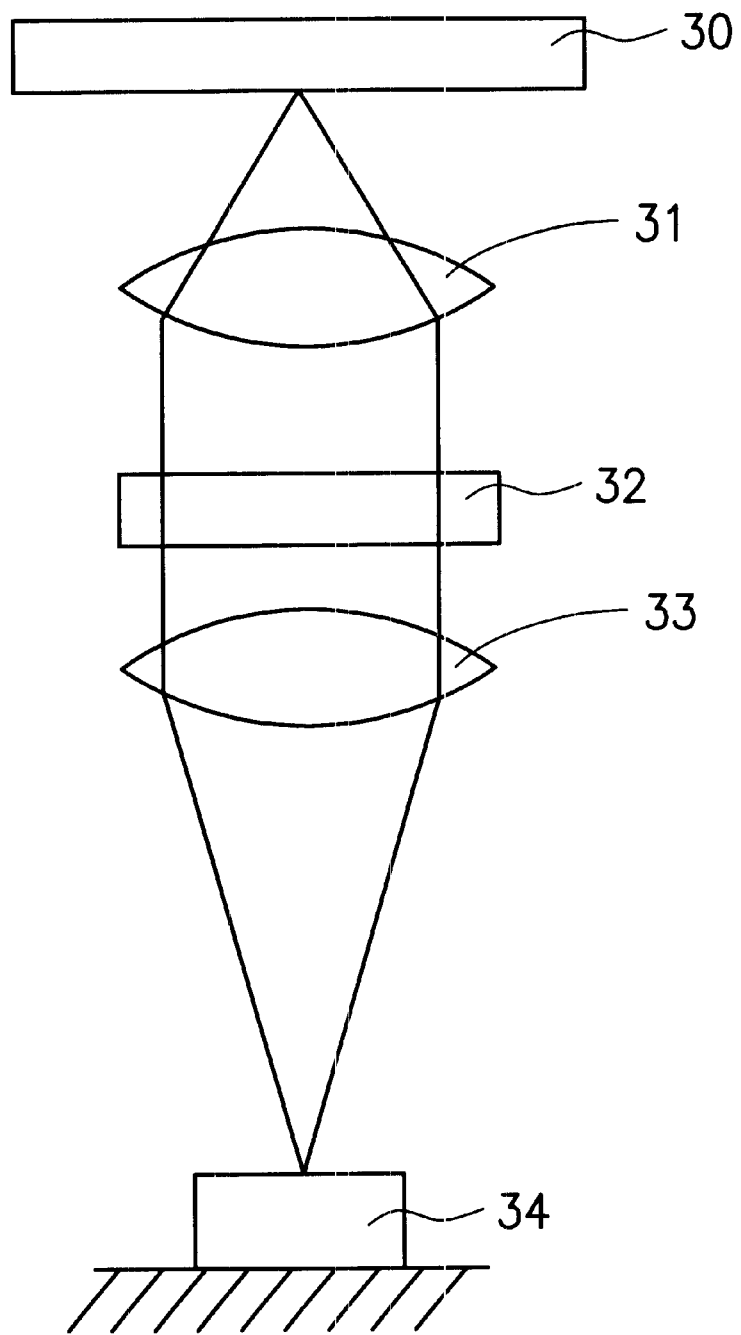
FIGS. 3A–3D is prior art representing a typical implementation of the astigmatic method for generating a focus error signal.
Figure 3B:
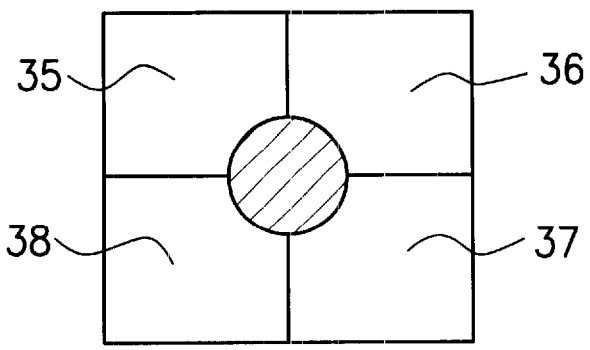
Figure 3C:
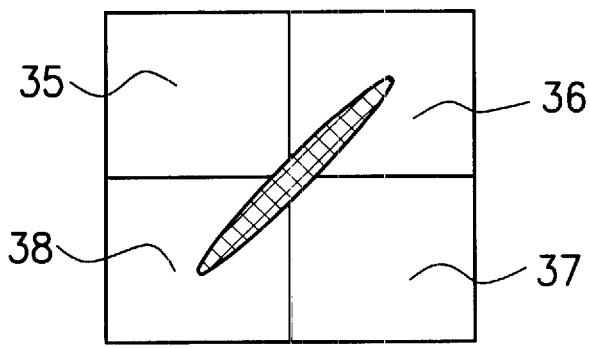
Figure 3D:
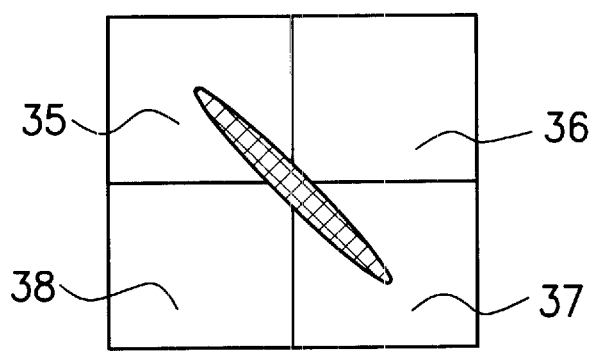
Figure 4:
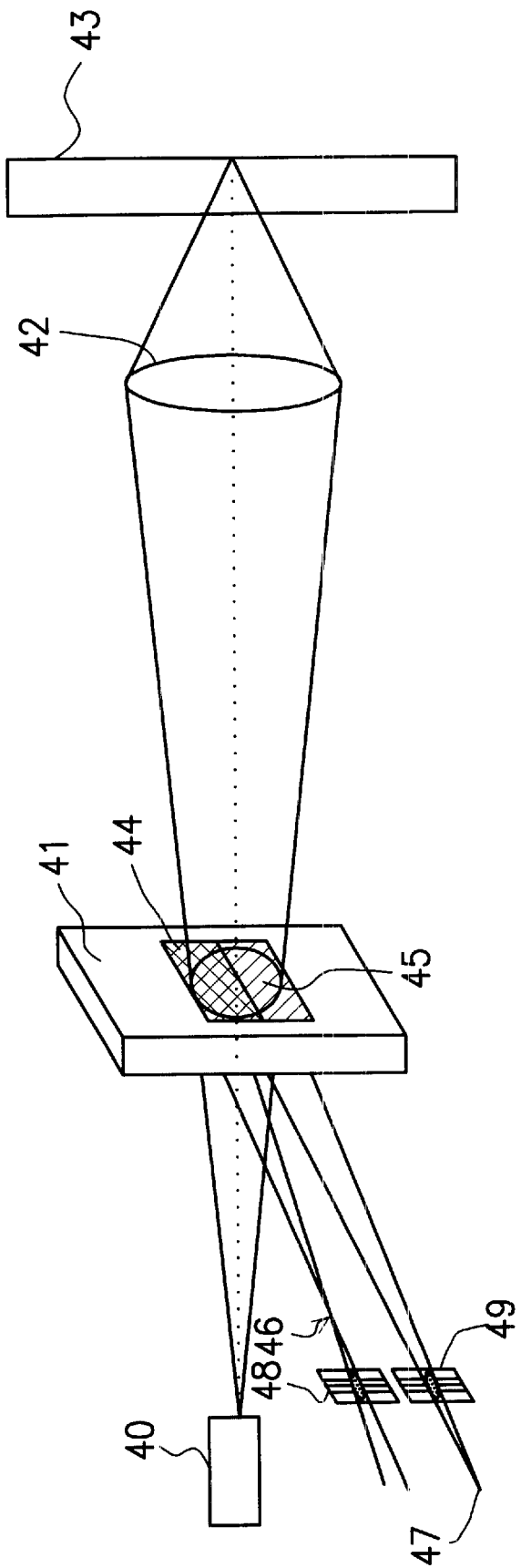
FIG. 4 is a schematic diagram depicting a first preferred embodiment of the focus/tracking method according to the invention.

FIG. 4 is a schematic diagram depicting a first preferred embodiment of the focus/tracking method and system according to the invention for focus/tracking control of the laser beam being used to read data from an optical disc, as designated by the reference numeral 43. As shown, the system includes a laser source 40, a holographic beamsplitter 41 having a first holographic region 44 and a second holographic region 45, a first multi-element photodetector 48, and a second multi-element photodetector 49.

The laser source 40 is used to generate a laser beam which then propagates in the forward direction through the holographic beamsplitter 41 toward the disc 43. At the holographic beamsplitter 41, the beam is diffracted, but only the 0-order (or undiffracted part) is used (this action is considered separate from any auxiliary grating device that may be combined with the holographic beamsplitter 41 to create multiple beams for 3-beam tracking). The 0-order component of the diffracted light is then focused by the objective lens 42 onto the information surface of the disc 43 where the data to be read out are located.

The returning light from the disc 43 then passes through the objective lens 42 back to the holographic beamsplitter 41. The returning light is again diffracted by the holographic beamsplitter 41 and one or more diffraction orders other than the 0-order are used to implement the beamsplitter action. The two holographic regions 44, 45 are used to diffract the returning light into different directions, which are designed in such a manner that they share a common boundary which divides the returning light into two essentially equal halves: a first half part and a second half part.

The first half part of the returning light is received and diffracted by the first holographic region 44 of the holographic beamsplitter 41 to converge at a first focus point 46 in front of the first multi-element photodetector 48; and then be incident on the first multi-element photodetector 48; while a second half part of the returning light is received and diffracted by the second holographic region 45 which steers and focuses the light towards a second focus point behind the second multi-element photodetector 49 and which is incident on said second multi-element photodetector 49.

The first and second multi-element photodetectors 48, 49 are identical in structure and form and mounted in the same plane. Each of the first and second multi-element photodetectors 48, 49 is formed with a plurality of elongated parallel light-sensitive elements. The parallel borderlines between the light-sensitive elements on the multi-element photodetectors 48, 49 are oriented in perpendicular to the boundary dividing the returning light into the two half-beams. The first and second multi-element photodetectors 48, 49 are disposed on the same plane.

Figure 7A:
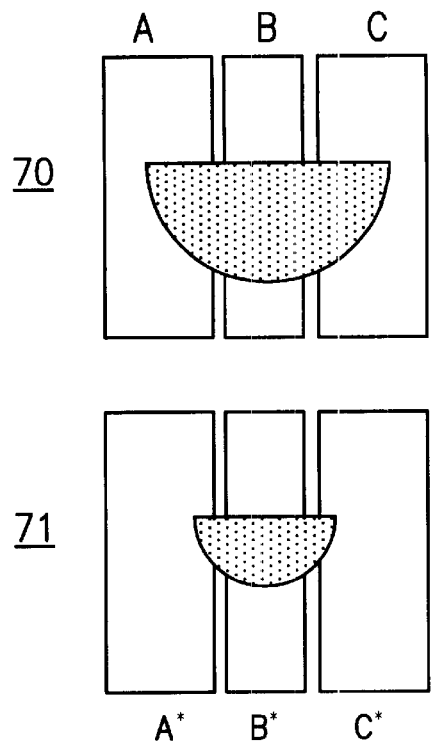
FIGS. 7A through 7C are schematic diagrams used to depict the structure and use of one example of the photodetectors used in the focus/tracking method and system of the invention.
Figure 7B:
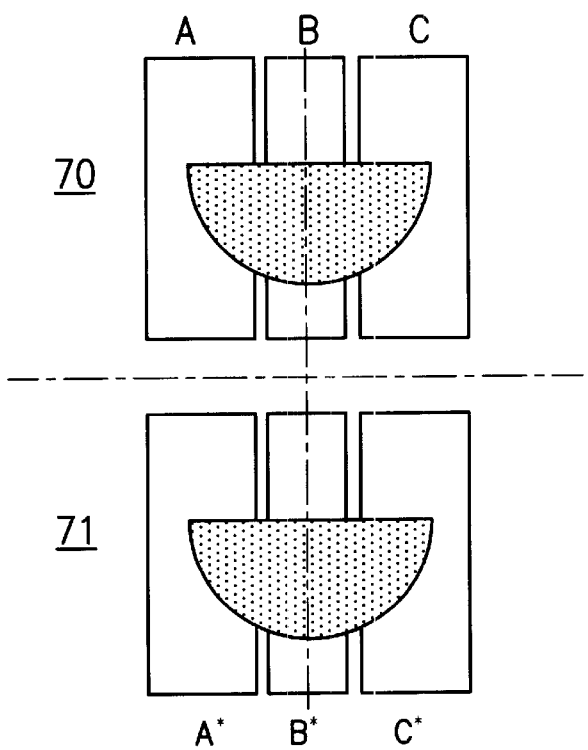
Figure 7C:
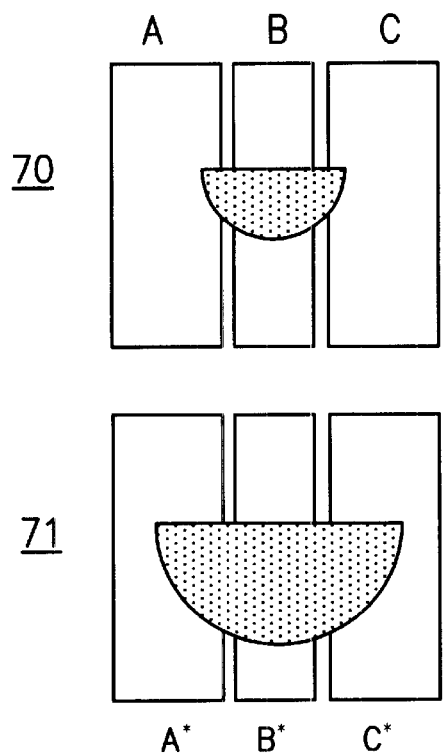
Figure 8A:
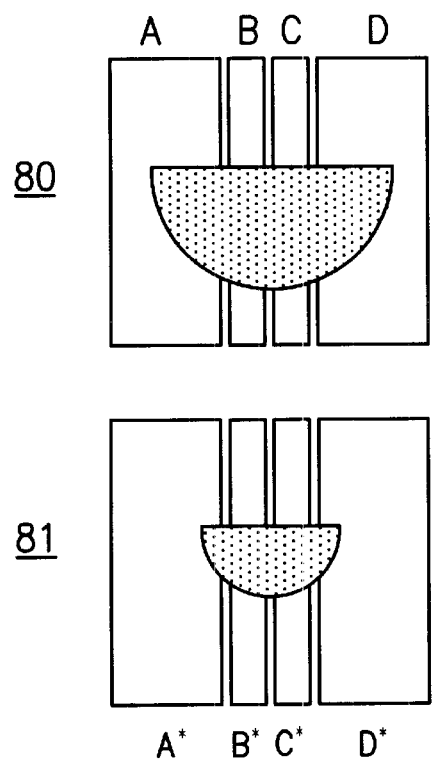
FIGS. 8A through 8C are schematic diagrams used to depict the structure and use of another example of the photodetectors used in the focus/tracking method and system of the invention.
Figure 8B:
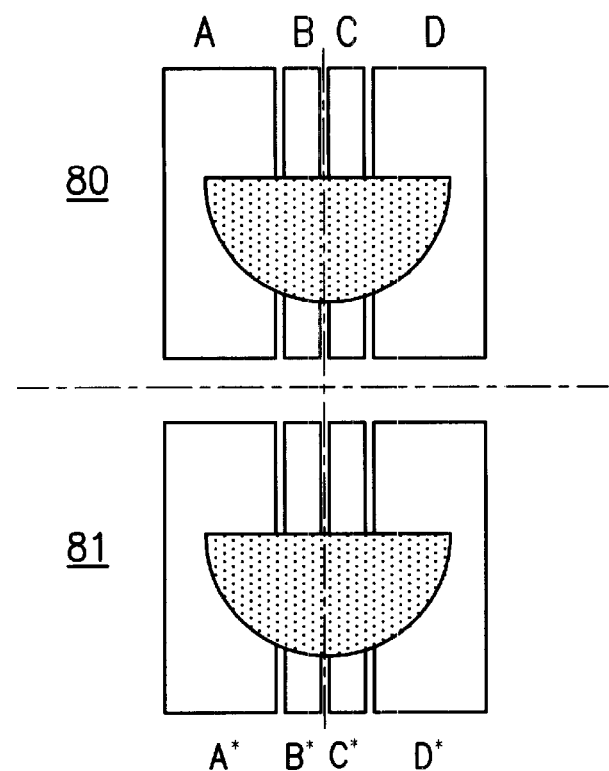
Figure 8C:
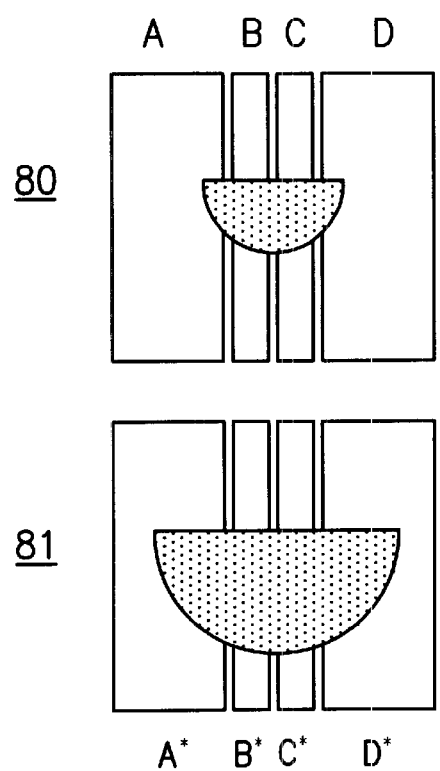

FIGS. 7A–7C and FIGS. 8A–8C show two examples of the first and second multi-element photodetectors used in the three preferred embodiments (i.e., 48, 49 in the first preferred embodiment, 57, 58 in the second preferred embodiment, and 68, 69 in the third preferred embodiment). The two multi-element photodetectors shown in FIGS. 7A–7C are here designated instead by the reference numerals 70 and 71, while the two multi-element photodetectors shown in FIGS. 8A–8C are here designated instead by the reference numerals 80 and 81.

Referring to FIGS. 7A–7C, in the first example, the first multi-element photodetector 70 includes three parallel light-sensitive elements A, B, C; and similarly, the second multi-element photodetector 71 includes three parallel light sensitive areas A*, B*, C*. The design of the holographic beamsplitter 11 and the positioning of the detectors 70 and 71 are arranged so that the following is true.

In the case of the laser beam from the laser source being focused at a point in front of the information surface of the disc, the spotted area of first half part of the returning light on the first multi-element photodetector 70 will be larger than that of the second half part of the returning light on the second multi-element photodetector 71, as indicated by the half-circled shaded areas in FIG. 7A.

In the case of the laser beam from the laser source being focused precisely on optical disc, the spotted area of first half part of the returning light on the first multi-element photodetector 70 will be equal to that of the second half part of the returning light on the second multi-element photodetector 71, as indicated by the half-circled shaded areas in FIG. 7B.

In the case of the laser beam from the laser source being focused behind the information surface of the disc, the spotted area of first half part of the returning light on the first multi-element photodetector 70 will be smaller than that of the second half part of the returning light on the second multi-element photodetector 71, as indicated by the half-circled shaded areas in FIG. 7C.

It is desired that the first half part and the second half part of the returning light respectively on the first and second multi-element photodetectors 70, 71 have equal spotted areas as illustrated in FIG. 7B. The focus error signal is therefore obtained from the opto-electrical signals generated from the light-sensitive elements of the first and second multi-element photodetectors 70, 71 in accordance with the following:

$$FES = A + C - B - (A^* + C^* - B^*)$$

where FES is the focus error signal, A, B, C represent the magnitudes of the opto-electrical signals generated respectively by the three light-sensitive elements of the first multi-element photodetector 70; and A*, B*, C* represent the magnitudes of the opto-electrical signals generated respectively by the three light-sensitive elements of the second multi-element photodetector 71.

Depending on the particular tracking method used by the optical drive, the tracking error signal can be obtained in different manners. For example, in the case of the DPD method, the tracking error signal TES is as follows:

$$TES_{(DPD)} = \text{Phase}(A + A^*) - \text{Phase}(C + C^*)$$

In the case of the heterodyne tracking method, $$TES_{(heterodyne)} = \text{Mixer Combination of} (A + A^* - C - C^*) \text{ and } (A + B + C + A^* + B^* + C^*)$$

In the case of the push-pull tracking method, $$TES_{(push-pull)} = (A + B + C) - (A^* + B^* + C^*)$$

Referring to FIGS. 8A–8C, in the second example, the first multi-element photodetector (here designated by the reference numeral 80) includes four parallel light-sensitive elements A, B, C, D; and similarly, the second multi-element photodetector (here designated by the reference numeral 81) includes four parallel light sensitive areas A*, B*, C*, D*. This embodiment is devised in particular to provide more precise separate access to the interference regions used in tracking. The dividing line between elements B and C in 80 and elements B* and C* in 81 is centered in the detectors and divides the incident beams into left and right quadrants. The design of the beamsplitter element 11 and the positions of the detectors 80 and 81 is arranged so that the following is true.

In the case of the laser beam from the laser source being focused at a point in front of the information surface of the disc, the spotted area of first half part of the returning light on the first multi-element photodetector 80 will be larger than that of the second half part of the returning light on the second multi-element photodetector 81, as indicated by the half-circled shaded areas in FIG. 8A.

In the case of the laser beam from the laser source being focused precisely on the information surface of the disc, the spotted area of first half part of the returning light on the first multi-element photodetector 80 will be equal to that of the second half part of the returning light on the second multi-element photodetector 81, as indicated by the half-circled shaded areas in FIG. 8B.

In the case of the laser beam from the laser source being focused behind the information surface of the disc, the spotted area of first half part of the returning light on the first multi-element photodetector 80 will be smaller than that of the second half part of the returning light on the second multi-element photodetector 81, as indicated by the half-circled shaded areas in FIG. 8C.

It is desired that the first half part and the second half part of the returning light respectively on the first and second multi-element photodetectors 80, 81 have equal spotted areas as illustrated in FIG. 8B. The focus error signal is therefore obtained from the opto-electrical signals generated from the light-sensitive elements of the first and second multi-element photodetectors 80, 81 in accordance with the following:

$$FES=(A+D-B-C)-(A^*+D^*-B^*-C^*)$$

where FES is the focus error signal; A, B, C, D represent the magnitudes of the opto-electrical signals generated respectively by the four light-sensitive elements of the first multi-element photodetector 80; and A*, B*, C*, D* represent the magnitudes of the opto-electrical signals generated respectively by the four light-sensitive elements of the second multi-element photodetector 81.

Depending on the particular tracking method used by the optical drive, the tracking error signal can be obtained in different manners. For example, in the case of the DPD method, the tracking error signal TES is as follows:

$$TES_{(DPD)}=\text{Phase}(A+B+A^*+B^*)-\text{Phase}(C+D+C^*+D^*)$$

In the case of the heterodyne tracking method, $$TES_{(heterodyne)}=\text{Mixer Combination of}(A+B+A^*+B^*-C-D-C^*-D^*) \text{ and } (A+B+C+D+A^*+B^*+C^*+D^*)$$

In the case of the push-pull tracking method, $$TES_{(push-pull)}=(A+B+C+D)-(A^*+B^*+C^*+D^*)$$

During the focusing operation, if the laser beam to be focused on the disc 43 is defocused in such a manner that the focus point is in front of the information surface of the disc 43, the spotted area of the first half part of the returning light on the first multi-element photodetector 48 will be larger than the spotted area of the second half part of the returning light on the second multi-element photodetector 49, and if the focus point is back of the disc 43, the spotted area of the first half part of the returning light on the first multi-element photodetector 48 will be smaller than that of the second half part of the returning light on the second multi-element photodetector 49; and if the focus point is right on the disc 43, the spotted area of the first half part of the returning light on the first multi-element photodetector 48 will be equal to that of the second half part of the returning light on the second multi-element photodetector 49.

Accordingly, whether the laser beam is focused precisely on the disc 43 can be determined by comparing the opto-electrical signals generated from the light-sensitive elements of the first and second multi-element photodetectors 48, 49 in response to the returning light from the disc 43. The magnitude of the opto-electrical signal generated from each light-sensitive element is proportional to the intensity of the light spotted thereon. The difference in the opto-electrical signals generated by the first and second multi-element photodetectors 48, 49 is then taken as a focus error signal, which is then used as a feedback signal to control the objective lens 42 to be shifted to the right position that allows the laser beam from the laser source 40 to be focused precisely on the disc 43. Moreover, a tracking error signal can be obtained from these opto-electrical signals generated from the light-sensitive elements of the first and second multi-element photodetectors 48, 49.

Second Preferred Embodiment

Figure 5:
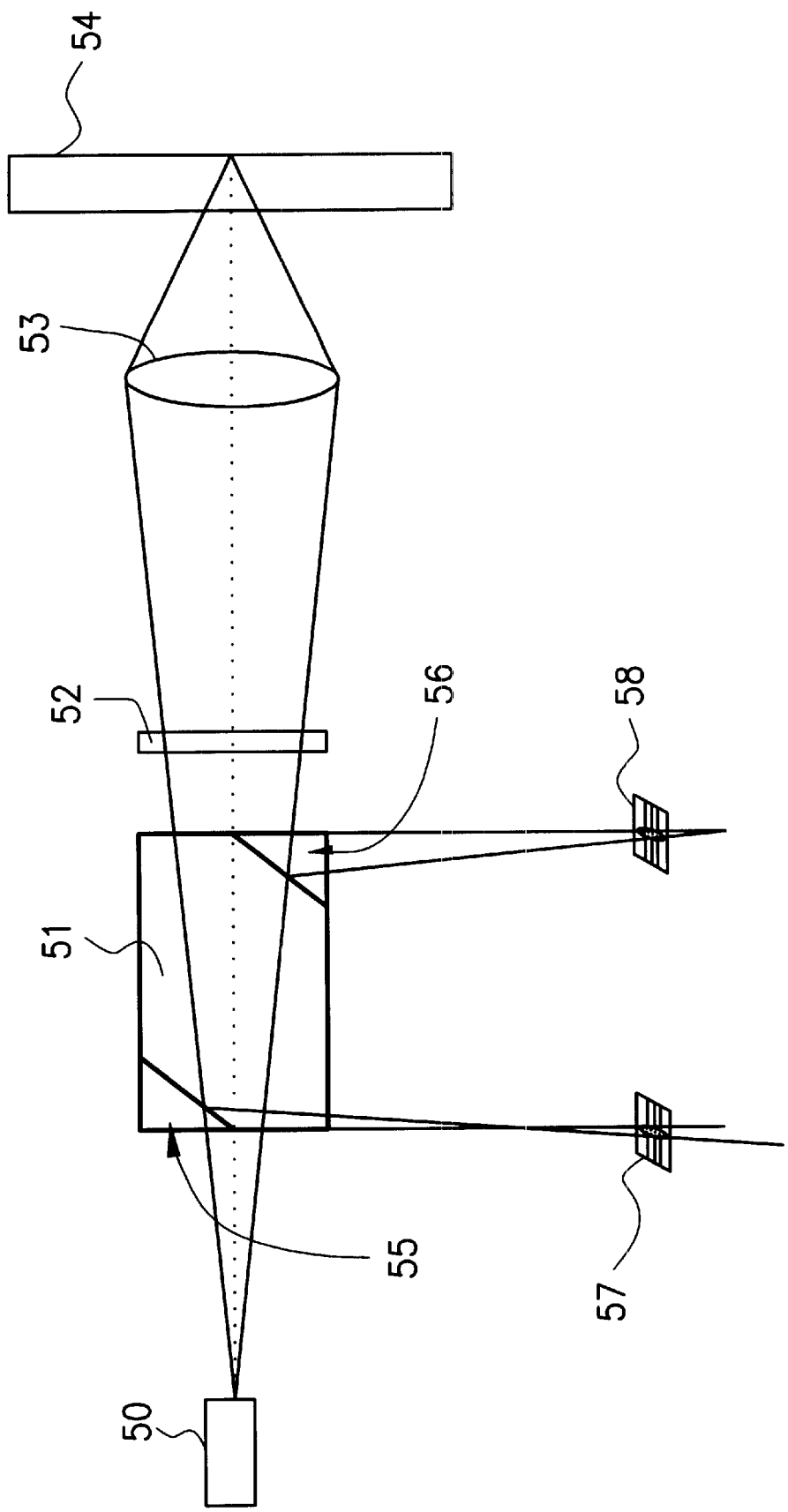
FIG. 5 is a schematic diagram depicting a second preferred embodiment of the focus/tracking method according to the invention.

FIG. 5 is a schematic diagram depicting a second preferred embodiment of the focus/tracking method according to the invention for focus/tracking control of the laser beam being used to read data from an optical disc, as designated by the reference numeral 54. In particular, this embodiment differs from the previous one in that a reflective-type beamsplitter (as designated by the reference numeral 51) is here used in place of the holographic beamsplitter 41 in the previous embodiment. Further, an optional quarterwave retarder 52 can be inserted in the optical path to improve light utilization. This reflective-type beamsplitter 51 may be of the polarizing beamsplitter type where one polarization of light is transmitted and the other reflected, or of the non-polarizing type where portions of both light polarizations are reflected and transmitted. By design in this preferred embodiment, the reflective-type beamsplitter 51 includes a first reflective surface 55 and a second reflective surface 56. Similar elements in this system (which are labeled here by different reference numerals) include a laser source 50, an objective lens 53, a first multi-element photodetector 57, and a second multi-element photodetector 58.

The laser source 50 is used to generate a laser beam which then propagates to the reflective-type beamsplitter 51. The reflective-type beamsplitter 5 1 can be of the type that is known as a polarizing beamsplitter which transmits one polarization component of the incident beam while reflecting the orthogonal polarization component from the slanted reflecting surfaces 55 and 56, or it can be of the type known as a non-polarizing beamsplitter where the slanted surfaces 55 and 56 are partially reflecting, transmitting part of the beam and reflecting the rest of the beam with no dependence on the polarization of the beam. The light passing through the reflective-type beamsplitter 51 then passes through the optional quarter-wave retarder 52 and subsequently focused by the objective lens 53 onto the information surface of the disc 54 where the data to be read out are located.

The returning light from the disc 54 then passes through the objective lens 53 and subsequently propagates through the optional quarter-wave retarder 52 back to the reflective-type beamsplitter 51. The first reflective surface 55 and the second reflective surface 56 are arranged in such a manner that the first reflective surface 55 receives and reflects a first half part of the returning light from the disc 54 toward the first multi-element photodetector 57 while the second reflective surface 56 receives and reflects a second half part of the returning light toward the second multi-element photodetector 58. The first half part of the returning light then converges at a focus point in front of the first multi-element photodetector 57, while the second half part of the returning light converges at a focus point behind the second multi-element photodetector 58.

The first and second multi-element photodetectors 57, 58 are identical in structure and form as those depicted FIGS. 7A–7C and FIGS. 8A–8C, so detailed description thereof will not be repeated. The first and second multi-element photodetectors 57, 58 are disposed on the same plane. Each of the first and second multi-element photodetectors 57, 58 is formed with a plurality of parallel light-sensitive elements which are oriented perpendicular to the line along which the beam reflected from disk 54 is divided into first and second half parts. In a similar manner as the previous embodiment, a focus error signal and a tracking error signal can be obtained from the opto-electrical signals generated by the first and second multi-element photodetectors 57, 58.

Third Preferred Embodiment

Figure 6:
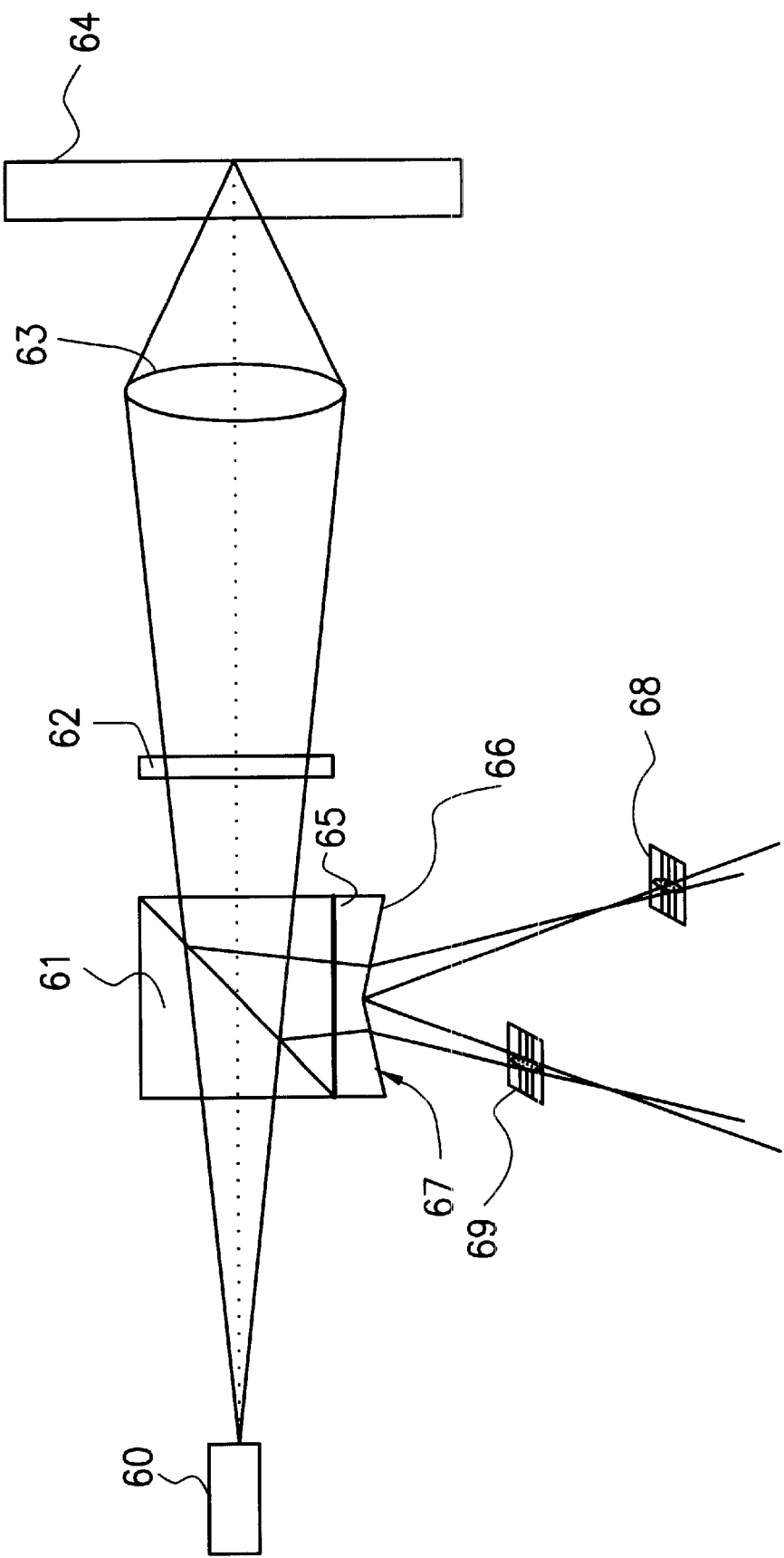
FIG. 6 is a schematic diagram depicting, a third preferred embodiment of the focus/tracking method according to the invention.

FIG. 6 is a schematic diagram depicting a third preferred embodiment of the focus/tracking method according to the invention for focus/tracking control of the laser beam being used to read data from an optical disc, as designated here by the reference numeral 64. In particular, this embodiment differs from the previous one in that a refractive-type beamsplitter which is an assembly of a standard beamsplitter (as designated by the reference numeral 61) and a specially-designed refractive beamsplitter element (as designated by the reference numeral 65) is used here in place of the reflective-type beamsplitter 51 in the previous embodiment of FIG. 5. Further, an optional quarter-wave retarder 62 can be inserted in the optical path to improve light utilization. The refractive beamsplitter element 65 is formed with a first refracting surface 66 and a second refracting surface 67. Similar elements in this system (which are designated here by different reference numerals) include a laser source 60, an objective lens 63, a first multi-element photodetector 68, and a second multi-element photodetector 69.

The laser source 60 is used to generate a laser beam which then passes through the beamsplitter 61 and the quarter-wave retarder 62 and subsequently focused by the objective lens 63 onto the disc 64 where the data to be read out are located. The returning light from the disc 64 then passes through the objective lens 63 and subsequently through the quarter-wave retarder 62 back to the beamsplitter 61 where it is subsequently reflected towards the refractive beamsplitter 65. The refractive beamsplitter element 65 has one side formed into a flat surface attached to the beamsplitter 61 and the opposite side formed into two inclined surfaces serving as a first refracting surface 66 and a second refracting surface 67. The first and second refracting surfaces 66, 67 are designed and shaped in such a manner that the first refracting surface 66 receives and diffracts a first half part of the returning light from the beamsplitter 61 toward the first multi-element photodetector 68, while the second refracting surface 67 receives and diffracts a second half part of the same returning light toward the second multi-element photodetector 69. The first half part of the returning light converges at a first focus point, while the second half part converges at a second focus point, with the first focus point and the second focus point being at two equidistant points from the refractive beamsplitter element 65. The first and second multi-element photodetectors 68, 69 are identical in structure and form as those depicted FIGS. 7A–7C and FIGS. 8A–8C, so detailed description thereof will not be repeated. The first multi-element photodetector 68 is positioned such that, when the optical stylus is properly focused on the information surface of the disk, the first focus point lies between the photodetector 68 and the beamsplitter surface 66. Under this same condition, the second photodetector 69 is positioned such that it is located between the second focus point and beamsplitter surface 67. The first and second multi-element photodetectors 68, 69 are identical in structure and form. The first and second multi-element photodetectors 68, 69 are each formed with a plurality of parallel light-sensitive elements which are oriented perpendicular to the common boundary between refractive beamsplitter surfaces 66 and 67. In a similar manner as the previous embodiment, a focus error signal and a tracking error signal can be obtained from the opto-electrical signals generated from the light-sensitive elements of the first and second multi-element photodetectors 68, 69.

One feature of the invention is the combination of a method for focusing control of the pickup head which accepts multiple wavelengths without requiring realignment and the single-beam tracking method for tracking control of the pickup head.

Another feature of the invention is the splitting of the returning light from the disc into two half parts, each being then directed to a specially designed multi-element photodetector detector which is formed with a plurality of parallel light-sensitive elements. The light-sensitive elements of one multi-element photodetector are also in parallel with those on the other multi-element photodetector and perpendicular to the line which divides the optical beam into two half beams. This design scheme allows the multi-element photodetectors used in the invention to provide the function of the conventional quadrant multi-element photodetector used in single-beam tracking method. The elongated dimension of the light-sensitive elements allows the optical beams to remain properly aligned with the photodetector elements even when a change in wavelength causes the light spot to shift along the photodetectors. The invention is therefore suitable for use on an optical drive with a multiple-wavelength laser source that allows the optical drive to read high-density or multi-layer discs.

Still another feature of the invention is the provision of a specially designed beamsplitter, which can be a holographic beamsplitter, a reflective-type beamsplitter, or a refractive-type beamsplitter, capable of splitting the returning light from the disc into two half parts which can be detected to obtain the focus error signal and the tracking error signal.

Still another feature of the invention is the capability of obtaining the focus error signal and the tracking error signal from the same set of multi-element photodetectors. The structure of the pickup head thus can be simplified to include less number of constituent components, allowing a reduction in manufacturing cost.

The invention introduces the combination of a special-function beamsplitter element and appropriately designed multi-element photodetectors to provide a focus/tracking system which can produce single-beam tracking error signals in a multi-wavelength optical pickup head with minimal number of components. It provides a way for a multi-wavelength-tolerant focus error detection to produce signals for the DPD tracking method, which is well-suited for use with high information density, multi-layer optical disc storage systems. Prior art versions of differential spot size focus detection could be used in a multi-wavelength system, but are not compatible with the single-beam tracking methods of heterodyne tracking and DPD. On the other hand, the astigmatic focus error detection method given in the prior art is compatible with these single-beam tracking methods, but, since it requires strict alignment in two orthogonal directions, it is not suitable for direct use in multi-wavelength systems.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A focus/tracking method for use on an optical drive to control the focus/tracking of a pickup head, comprising the steps of:

(1) generating a laser beam;
   (2) focusing the laser beam on an optical disc;
   (3) splitting a returning light from the optical disc in half along a line into a first half part and a second half part, wherein a first multi-element photodetector is formed with three parallel light-sensitive elements oriented perpendicular to the line dividing the light returning from the disc into the first half part and the second half part, each of which is capable of generating an opto-electrical signal whose magnitude is proportional to the intensity of the returning light from the optical disc spotted thereon, the three opto-electrical signals generated respectively by said three light-sensitive elements of said first multi-element photodetector being designated by A, B, and C; and
      a second multi-element photo detector is formed with three parallel light-sensitive elements oriented perpendicular to the line which divides the light returning from the disc into first and second half parts, each of which is capable of generating an opto-electrical signal whose magnitude is proportional to the intensity of the returning light from the optical disc spotted thereon, the three opto-electrical signals generated respectively by said three light-sensitive elements of said second multi-element photodetector being designated by A*, B*, and C*;
   (4) guiding the first half part of the returning light to a first optical axis while guiding the second half part of the returning light to a second optical axis;
   (5) at a fixed position on said first optical axis, detecting the first half part of the returning light to thereby generating a first set of opto-electrical signals;
   (6) at a fixed position on said second optical axis, detecting the second half part of the returning light to thereby generating a second set of opto-electrical signals; and
   (7) from said first and second set of opto-electrical signals, obtaining a focus error signal and a tracking error signal, said focus error signal being used for feedback control of the focusing of the laser beam until the laser beam is focused precisely on the optical disc, and said tracking error signal being used for feedback control of the tracking of the laser beam until the laser beam is spotted on the target data track,
      using a plurality of laser sources, each capable of generating a laser beam of a unique wavelength, and which are connected via optical fibers in a coaxial position, allowing each laser beam having a unique wavelength to be emitted along a same optical axis in a same direction, and
      wherein said optical fibers are linked to an optical coupler which allows a selected one of the laser beams having a unique wavelength to be guided to a source fiber which emits the selected laser beam along the same optical axis in the same direction.

2. The method of claim 1, wherein in said step (1), a multiple-wavelength laser source is used to generate the laser beam.

3. The method of claim 1, wherein said laser means includes:
   a plurality of laser sources, each being selected for use to generating a laser beam of a specific wavelength; and
   a combinator for guiding each one of the various laser beams generated by the plurality of laser sources to the same optical axis.

4. The method of claim 1, wherein said optical fibers are disposed in parallel and close proximity with each other, allowing each one of the laser beams to be emitted along the same optical axis in the same direction.

5. The method of claim 1, wherein said laser means includes a laser diode mounted on a substrate, said laser diode being capable of generating various wavelengths of laser beams.

6. The method of claim 1, wherein said beam splitting means is a holographic beamsplitter having a first holographic region and a second holographic region which are disposed to receive and split the returning light from the optical disc in half into said first and second half parts.

7. The method of claim 1, wherein said beam splitting means is a reflective-type beamsplitter having:
   a first reflective surface arranged to receive and reflect a half part of the returning light from the optical disc along the first optical axis toward a first multi-element photodetector, and
   a second reflective surface arranged to receive and reflect another half part of the returning light from the optical disc along the second optical axis toward a second multi-element photodetector.

8. The method of claim 1, wherein said beam splitting means is a refractive-type beam splitting means including:
   a standard beamsplitter coupled to receive the returning light from the optical disc; and
   a refractive beamsplitter element coupled to said standard beamsplitter, said refractive beamsplitter element having a first refracting surface and a second refracting surface which are disposed to receive and split the returning light from the optical disc in half into said first and second half parts.

9. The method of claim 1, wherein a first multi-element photodetector is disposed behind the converging point of the first half part of the returning light, and a second multi-element photodetector is disposed in front of the converging point of the second half part of the returning light when the optical beam is focused on the information surface of the disk.

10. The method of claim 9, wherein said first and second multi-element photodetectors are disposed on two different planes.

11. The method of claim 1, wherein the focus error signal FES is obtained from the following equation:

FES=A+C−B−(A*+C*−B*)

12. The method of claim 1, wherein in the case of using DPD tracking method, the tracking error signal is obtained from the phase difference between (A+A*) and (C+C*).

13. The method of claim 1, wherein in the case of using the heterodyne tracking method, the tracking error signal is obtained by mixing (A+A*−C−C*) with (A+B+C+A*+B*+C*).

14. The method of claim 1, wherein in the case of using the push-pull tracking method, the tracking error signal is obtained from (A+B+C)−(A*+B*+C*).

15. A focus/tracking method for use on an optical drive to control the focus/tracking of a pickup head, comprising the steps of:

(1) generating a laser beam;

(2) focusing the laser beam on an optical disc;

(3) splitting a returning light from the optical disc in half along a line into a first half part and a second half part;

(4) guiding the first half part of the returning light to a first optical axis while guiding the second half part of the returning light to a second optical axis;

(5) at a fixed position on said first optical axis, detecting the first half part of the returning light to thereby generating a first set of opto-electrical signals;

(6) at a fixed position on said second optical axis, detecting the second half part of the returning light to thereby generating a second set of opto-electrical signals; and (7) from said first and second set of opto-electrical signals, obtaining a focus error signal and a tracking error signal, said focus error signal being used for feedback control of the focusing of the laser beam until the laser beam is focused precisely on the optical disc, and said tracking error signal being used for feedback control of the tracking of the laser beam until the laser beam is spotted on the target data track, using a plurality of laser sources, each capable of generating a laser beam of a unique wavelength, and which are connected via optical fibers in a coaxial position, allowing each laser beam having a unique wavelength to be emitted along a same optical axis in a same direction, and wherein said optical fibers are linked to an optical coupler which allows a selected one of the laser beams having a unique wavelength to be guided to a source fiber which emits the selected laser beam along the same optical axis in the same direction, and wherein a first multi-element photodetector is formed with four parallel light-sensitive elements oriented perpendicular to the line which divides the light returning from the disc into first and second half parts, each of which is capable of generating an opto-electrical signal whose magnitude is proportional to the intensity of the returning light from the optical disc spotted thereon, the four opto-electrical signals generated respectively by said four light-sensitive elements of said first multi-element photodetector being designated by A, B, C, and D; and a second multi-element photodetector is formed with four parallel light-sensitive elements oriented perpendicular to the line which divides the light returning from the disc into first and second half parts, each of which is capable of generating an opto-electrical signal whose magnitude is proportional to the intensity of the returning light from the optical disc spotted thereon, the four opto-electrical signals generated respectively by said four light-sensitive elements of said second multi-element photodetector being designated by A*, B*, C*, and D*.

16. The method of claim 15, wherein the focus error signal is obtained from (A+D−B−C)−(A*+D*−B*−C*).

17. The method of claim 15, wherein in the case of using the DPD tracking method, the tracking error signal is obtained from the phase difference between (A+B+A*+B*) and (C+D+C*+D*).

18. The method of claim 15, wherein in the case of using the heterodyne tracking method, the tracking error signal is obtained by mixing (A+B+A*+B*−C−D−C*−D*) with (A+B+C+D+A*+B*+C*+D*).

19. The method of claim 15, wherein in the case of using the push-pull tracking method, the tracking error signal is obtained from (A+B+C+D)−(A*+B*+C*+D*).

20. An apparatus for control of the focus/tracking of a pickup head of an optical drive to read data from an optical disc, which comprises:

laser means for generating a laser beam of a specific wavelength;

an objective lens, optically coupled to said laser means, for focusing the laser beam onto the optical disc;

beam splitting means, optically coupled to said objective lens, capable of splitting a returning light form the optical disc in half into a first half part and a second half part and directing the first half part of the returning light along a first optical axis and the second half part of the returning light along a second optical axis; and a first multi-element photodetector disposed on the first optical axis, said first multi-element photodetector being formed with three parallel light-sensitive elements, each of which is capable of generating an opto-electrical signal in response to the first half part of the returning light spotted thereon, whose magnitude is proportional to the intensity of the returning light from the optical disc spotted thereon, the three opto-electrical signals generated respectively by said three light-sensitive elements of said first multi-element photodetector being designated A, B, and C; and a second multi-element photodetector disposed on the second optical axis, said second multi-element photodetector being formed with three parallel light-sensitive elements, each of which is capable of generating an opto-electrical signal in response to the second half part of the returning light spotted thereon, whose magnitude is proportional to the intensity of the returning light from the optical disc spotted thereon, the three opto-electrical signals generated respectively by said three light-sensitive elements of said second multi-element photodetector being designated by A*, B*, and C*; and wherein a focus error signal and a tracking error signal are obtained from said opto-electrical signals from said first and second multi-element photodetectors, said focus error signal being used for feedback control of the focusing of the laser beam until the laser beam is focused precisely on the optical disc, and said tracking error signal being used for feedback control of the tracking of the laser beam until the laser beam is spotted on the target data track, wherein said laser means includes a plurality of laser sources, each capable of generating a laser beam of a unique wavelength, and which are connected via optical fibers in a coaxial position, allowing each laser beam having a unique wavelength to be emitted along a same optical axis in the same direction, wherein said optical fibers are linked to an optical coupler which allows a selected one of the laser beams having a unique wavelength to be guided to a source fiber which emits the selected laser beam along the same optical axis in the same direction, and wherein said laser means includes a laser diode mounted on a substrate.

21. The apparatus of claim 18, wherein said laser means is a multiple-wavelength laser source.

22. The apparatus of claim 20, wherein said laser means includes:

a plurality of laser sources, each being selected for use to generating a laser beam of a specific wavelength; and
a combinator for guiding each one of the various laser beams generated by the plurality of laser sources to the same optical axis.

23. The apparatus of claim 20, wherein said optical fibers are disposed in parallel and close proximity with each other, allowing each one of the laser beams to be emitted along the same optical axis in the same direction.

24. The apparatus of claim 20, wherein said beam splitting means is a holographic beamsplitter having a first holographic region and a second holographic region which are disposed to receive and split the returning light from the optical disc in half into said first and second half parts.

25. The apparatus of claim 20, wherein said beam splitting means is a reflective-type beamsplitter having:

a first reflective surface arranged to receive and reflect a half part of the returning light from the optical disc along the first optical axis toward a first multi-element photodetector, and
a second reflective surface arranged to receive and reflect another half part of the returning light from the optical disc along the second optical axis toward a second multi-element photodetector.

26. The apparatus of claim 20, wherein said beam splitting means is a refractive-type beam splitting means including:

a standard beamsplitter coupled to receive the returning light from the optical disc; and
a refractive beamsplitter element coupled to said standard beamsplitter, said refractive beamsplitter element having a first refracting surface and a second refracting surface which are disposed to receive and split the returning light from the optical disc in half into said first and second half parts.

27. The apparatus of claim 20, wherein said first multi-element photodetector is disposed behind the converging point of the first half part of the returning light, and said second multi-element photodetector is disposed in front of the converging point of the second half part of the returning light.

28. The apparatus of claim 27, wherein said first multi-element photodetector is disposed in front of the converging point of the first half part of the returning light, and said second multi-element photodetector is disposed behind the converging point of the second half part of the returning light.

29. The apparatus of claim 27, wherein said first and second multi-element photodetectors are disposed on two different planes.

30. The apparatus of claim 20, wherein said first and second multi-element photodetectors are disposed in parallel on the same plane.

31. The apparatus of claim 20, wherein said first and second multi-element photodetectors are disposed on a plane which is parallel to the surface of the optical disc.

32. The apparatus of claim 20, wherein the focus error signal FES is obtained from the following equation:

$$FES=A+C-B-(A^*+C^*-B^*)$$

33. The apparatus of claim 20, wherein in the case of using DPD tracking method, the tracking error signal is obtained from the phase difference between $(A+A^*)$ and $(C+C^*)$.

34. The apparatus of claim 20, wherein in the case of using the heterodyne tracking method, the tracking error signal is obtained by mixing $(A+A^*-C-C^*)$ with $(A+B+C+A^*+B^*+C^*)$.

35. The apparatus of claim 20, wherein in the case of using the push-pull tracking method, the tracking error signal is obtained from $(A+B+C)-(A^*+B^*+C^*)$.

36. An apparatus for control of the focus/tracking of a pickup head of an optical drive to read data from an optical disc, which comprises:

laser means for generating a laser beam of a specific wavelength;

an objective lens, optically coupled to said laser means, for focusing the laser beam onto the optical disc;

beam splitting means, optically coupled to said objective lens, capable of splitting a returning light from the optical disc in half into a first half part and a second half part and directing the first half part of the returning light along a first optical axis and the second half part of the returning light along a second optical axis; and a first multi-element photodetector disposed on the first optical axis, said first multi-element photodetector is formed with four parallel light-sensitive elements, each of which is capable of generating an opto-electrical signal whose magnitude is proportional to the intensity of the returning light from the optical disc spotted thereon, the four opto-electrical signals generated respectively by said four light-sensitive elements of said first multi-element photodetector being designated by A, B, C, and D; and a second multi-element photodetector disposed on the second optical axis, said second multi-element photodetector is formed with four parallel light-sensitive elements, each of which is capable of generating an opto-electrical signal whose magnitude is proportional to the intensity of the returning light from the optical disc spotted thereon, the four opto-electrical signals generated respectively by said four light-sensitive elements of said second multi-element photodetector being designated by $A^*$, $B^*$, $C^*$, and $D^*$; and wherein a focus error signal and a tracking error signal are obtained from said opto-electrical signals from said first and second multi-element photodetectors, said focus error signal being used for feedback control of the focusing of the laser beam until the laser beam is focused precisely on the optical disc, and said tracking error signal being used for feedback control of the tracking of the laser beam until the laser beam is spotted on the target data track, wherein said laser means includes a plurality of laser sources, each capable of generating a laser beam of a unique wavelength, and which are connected via optical fibers in a coaxial position, allowing each laser beam having a unique wavelength to be emitted along a same optical axis in the same direction, wherein said optical fibers are linked to an optical coupler which allows a selected one of the laser beams having a unique wavelength to be guided to a source fiber which emits the selected laser beam along the same optical axis in the same direction, and wherein said laser means includes a laser diode mounted on a substrate.

37. The apparatus of claim 36, wherein the focus error signal is obtained from $(A+D-B-C)-(A^*+D^*-B^*-C^*)$.

38. The apparatus of claim 36, wherein in the case of using the DPD tracking method, the tracking error signal is obtained from the phase difference between $(A+B+A^*+B^*)$ and $(C+D+C^*+D^*)$.

39. The apparatus of claim 36, wherein in the case of using the heterodyne tracking method, the tracking error signal is obtained by mixing $(A+B+A^*+B^*-C-D-C^*-D^*)$ with $(A+B+C+D+A^*+B^*+C^*+D^*)$.

40. The apparatus of claim 36, wherein in the case of using the push-pull tracking method, the tracking error signal is obtained from $(A+B+C+D)-(A^*+B^*+C^*+D^*)$.

* * * * *